(12) United States Patent
Okamoto

(10) Patent No.: US 9,214,676 B2
(45) Date of Patent: Dec. 15, 2015

(54) POSITIVE ELECTRODE ACTIVE MATERIAL FOR LITHIUM ION BATTERIES, POSITIVE ELECTRODE FOR LITHIUM ION BATTERIES, AND LITHIUM ION BATTERY

(75) Inventor: Kentaro Okamoto, Kitaibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 206 days.

(21) Appl. No.: 13/984,947

(22) PCT Filed: Mar. 27, 2012

(86) PCT No.: PCT/JP2012/057974
§ 371 (c)(1),
(2), (4) Date: Aug. 12, 2013

(87) PCT Pub. No.: WO2012/133434
PCT Pub. Date: Oct. 4, 2012

(65) Prior Publication Data
US 2013/0316239 A1    Nov. 28, 2013

(30) Foreign Application Priority Data

Mar. 31, 2011   (JP) .................................. 2011-079268
Oct. 4, 2011    (WO) .................. PCT/JP2011/072865

(51) Int. Cl.
*H01M 4/52*   (2010.01)
*H01M 4/505*  (2010.01)
(Continued)

(52) U.S. Cl.
CPC ................. *H01M 4/52* (2013.01); *C01G 53/42* (2013.01); *C01G 53/50* (2013.01); *H01M 4/505* (2013.01);
(Continued)

(58) Field of Classification Search
CPC ..... H01M 4/485; H01M 4/505; H01M 4/525; H01M 10/0525; C01P 2004/50; C01P 2004/03; C01G 53/50; Y02E 60/122
See application file for complete search history.

(56) References Cited

U.S. PATENT DOCUMENTS

| 2,165,128 A | 7/1939 | Cheesman |
| 4,443,186 A | 4/1984 | Shell |

(Continued)

FOREIGN PATENT DOCUMENTS

| CN | 1520621 A | 8/2004 |
| CN | 1701451 A | 11/2005 |

(Continued)

OTHER PUBLICATIONS

English translation of JP Publication 2007-257890, Oct. 2007.*
(Continued)

*Primary Examiner* — Brittany Raymond
(74) *Attorney, Agent, or Firm* — Nields, Lemack & Frame, LLC

(57) ABSTRACT

The present invention provides a positive electrode active material for lithium ion batteries having satisfactory battery characteristics. The positive electrode active material for lithium ion batteries, is represented by the following composition formula:

$$Li(Li_xNi_{1-x-y}M_y)O_{2+\alpha}$$

wherein M represents one or more selected from the group consisting of scandium (Sc), titanium (Ti), vanadium (V), chromium (Cr), manganese (Mn), iron (Fe), cobalt (Co), copper (Cu), zinc (Zn), gallium (Ga), germanium (Ge), bismuth (Bi), tin (Sn), magnesium (Mg), calcium (Ca), boron (B) and zirconium (Zr); $0 \leq x \leq 0.1$; $0 < y \leq 0.7$; and $\alpha > 0$,
  wherein the particle size of primary particles is 1.6 to 2.3 µm,
  the alkali amount at the particle surfaces measured by two-stage neutralization titration is 1.2% by mass or less, and
  when the amount of lithium hydroxide in the alkali amount at the particle surfaces is designated as A % by mass, and the amount of lithium carbonate is designated as B % by mass, the ratio A/B is 1 or less.

14 Claims, 1 Drawing Sheet

— primary particle secondary particle
(formed as a result of aggregation of primary particles)

(51) Int. Cl.
*H01M 4/525* (2010.01)
*C01G 53/00* (2006.01)
H01M 4/485 (2010.01)
H01M 10/0525 (2010.01)

(52) U.S. Cl.
CPC .......... *H01M 4/525* (2013.01); *C01P 2004/03* (2013.01); *C01P 2004/50* (2013.01); *H01M 4/485* (2013.01); *H01M 10/0525* (2013.01); *Y02E 60/122* (2013.01)

(56) References Cited

U.S. PATENT DOCUMENTS

| | | | |
|---|---|---|---|
| 4,462,793 | A | 7/1984 | Maeda et al. |
| 4,469,654 | A | 9/1984 | Haskett et al. |
| 5,393,622 | A | 2/1995 | Nitta et al. |
| 5,478,674 | A | 12/1995 | Miyasaka |
| 5,759,714 | A | 6/1998 | Matsufuji et al. |
| 6,037,095 | A | 3/2000 | Miyasaka |
| 6,123,911 | A | 9/2000 | Yamaguchi et al. |
| 6,423,447 | B1 | 7/2002 | Ohsaki et al. |
| 6,582,854 | B1 | 6/2003 | Qi et al. |
| 6,984,469 | B2 | 1/2006 | Kweon et al. |
| 7,332,248 | B2 | 2/2008 | Kase et al. |
| 7,410,728 | B1 | 8/2008 | Fujimoto et al. |
| 7,645,542 | B2 | 1/2010 | Kase et al. |
| 8,354,191 | B2 | 1/2013 | Shizuka et al. |
| 8,623,551 | B2 | 1/2014 | Kawahashi et al. |
| 8,748,041 | B2 | 6/2014 | Satoh et al. |
| 8,993,160 | B2 | 3/2015 | Nagase |
| 9,090,481 | B2 | 7/2015 | Satoh |
| 2002/0106561 | A1 | 8/2002 | Lee et al. |
| 2003/0082448 | A1 | 5/2003 | Cho et al. |
| 2003/0104279 | A1 | 6/2003 | Miyazaki et al. |
| 2003/0126803 | A1 | 7/2003 | Rosenflanz |
| 2003/0211391 | A1 | 11/2003 | Cho et al. |
| 2004/0053134 | A1 | 3/2004 | Ozaki et al. |
| 2004/0110063 | A1 | 6/2004 | Uchitomi et al. |
| 2004/0197658 | A1 | 10/2004 | Kase et al. |
| 2005/0079416 | A1 | 4/2005 | Ohzuku et al. |
| 2005/0142442 | A1 | 6/2005 | Yuasa et al. |
| 2005/0158546 | A1 | 7/2005 | Shizuka |
| 2006/0083989 | A1 | 4/2006 | Suhara et al. |
| 2006/0121350 | A1 | 6/2006 | Kajiya et al. |
| 2006/0127765 | A1 | 6/2006 | Machida et al. |
| 2006/0204849 | A1 | 9/2006 | Saito et al. |
| 2006/0233696 | A1 | 10/2006 | Paulsen et al. |
| 2006/0281005 | A1 | 12/2006 | Cho et al. |
| 2007/0015058 | A1 | 1/2007 | Takezawa et al. |
| 2007/0141469 | A1 | 6/2007 | Tokunaga et al. |
| 2007/0202405 | A1 | 8/2007 | Shizuka et al. |
| 2007/0248883 | A1 | 10/2007 | Oda et al. |
| 2007/0298512 | A1 | 12/2007 | Park et al. |
| 2008/0044736 | A1 | 2/2008 | Nakura |
| 2008/0081258 | A1 | 4/2008 | Kim et al. |
| 2009/0117464 | A1 | 5/2009 | Cho et al. |
| 2009/0117469 | A1 | 5/2009 | Hiratsuka et al. |
| 2009/0148772 | A1 | 6/2009 | Kawasato et al. |
| 2009/0233176 | A1 | 9/2009 | Kita et al. |
| 2009/0286164 | A1 | 11/2009 | Wada et al. |
| 2009/0289218 | A1 | 11/2009 | Kajiya et al. |
| 2009/0299922 | A1 | 12/2009 | Malcus et al. |
| 2009/0305136 | A1 | 12/2009 | Yada et al. |
| 2010/0015514 | A1 | 1/2010 | Miyagi et al. |
| 2010/0019194 | A1 | 1/2010 | Fujiwara et al. |
| 2010/0112447 | A1 | 5/2010 | Yamamoto et al. |
| 2010/0136412 | A1 | 6/2010 | Watanabe |
| 2010/0143583 | A1 | 6/2010 | Honda et al. |
| 2010/0183922 | A1 | 7/2010 | Cho et al. |
| 2010/0209757 | A1 | 8/2010 | Ooyama et al. |
| 2010/0209771 | A1 | 8/2010 | Shizuka et al. |
| 2010/0227222 | A1 | 9/2010 | Chang et al. |
| 2011/0031437 | A1 | 2/2011 | Nagase et al. |
| 2011/0033749 | A1 | 2/2011 | Uchida et al. |
| 2011/0076558 | A1* | 3/2011 | Miyazaki et al. ............ 429/199 |
| 2011/0250499 | A1 | 10/2011 | Hiratsuka |
| 2012/0034525 | A1 | 2/2012 | Satoh et al. |
| 2012/0231342 | A1 | 9/2012 | Satoh et al. |
| 2012/0231343 | A1 | 9/2012 | Nagase et al. |
| 2012/0244434 | A1 | 9/2012 | Nagase |
| 2012/0292562 | A1 | 11/2012 | Kajiya et al. |
| 2012/0319036 | A1 | 12/2012 | Kajiya et al. |
| 2012/0319037 | A1 | 12/2012 | Kawahashi et al. |
| 2012/0319039 | A1 | 12/2012 | Satoh et al. |
| 2012/0319040 | A1 | 12/2012 | Okamoto et al. |
| 2012/0321956 | A1 | 12/2012 | Kawahashi et al. |
| 2012/0326080 | A1 | 12/2012 | Okamoto et al. |
| 2012/0326098 | A1 | 12/2012 | Satoh |
| 2012/0326099 | A1 | 12/2012 | Satoh |
| 2012/0326101 | A1 | 12/2012 | Satoh |
| 2012/0326102 | A1 | 12/2012 | Satoh |
| 2013/0001463 | A1 | 1/2013 | Okamoto et al. |
| 2013/0004849 | A1 | 1/2013 | Satoh |
| 2013/0043428 | A1 | 2/2013 | Kawahashi et al. |
| 2013/0108921 | A1 | 5/2013 | Kase et al. |
| 2013/0143121 | A1 | 6/2013 | Kobayashi et al. |
| 2013/0175470 | A1 | 7/2013 | Kajiya et al. |
| 2013/0221271 | A1 | 8/2013 | Nagase et al. |
| 2014/0306152 | A1 | 10/2014 | Okamoto |
| 2014/0339465 | A1 | 11/2014 | Okamoto |
| 2014/0339466 | A1 | 11/2014 | Okamoto |
| 2015/0123029 | A1 | 5/2015 | Nagase et al. |
| 2015/0188134 | A1 | 7/2015 | Kameyama et al. |

FOREIGN PATENT DOCUMENTS

| | | | |
|---|---|---|---|
| CN | 1710735 | A | 12/2005 |
| CN | 1947288 | A | 4/2007 |
| CN | 101478044 | A | 7/2009 |
| EP | 0794155 | A1 | 9/1997 |
| EP | 0903796 | A1 | 3/1999 |
| EP | 1244164 | A1 | 9/2002 |
| EP | 1317008 | A2 | 6/2003 |
| EP | 1391950 | A1 | 2/2004 |
| EP | 1450423 | A1 | 8/2004 |
| EP | 1742281 | A1 | 1/2007 |
| EP | 2023426 | A1 | 2/2009 |
| EP | 2207226 | A1 | 7/2010 |
| EP | 2207227 | A1 | 7/2010 |
| EP | 2219251 | A1 | 8/2010 |
| EP | 2533333 | A1 | 12/2012 |
| JP | 4-328277 | A | 11/1992 |
| JP | 6-275274 | A | 9/1994 |
| JP | 7-29603 | A | 1/1995 |
| JP | 7-211311 | A | 8/1995 |
| JP | 8-138669 | A | 5/1996 |
| JP | 8-213015 | A | 8/1996 |
| JP | 09-82325 | A | 3/1997 |
| JP | 9-120813 | A | 5/1997 |
| JP | 9-270257 | A | 10/1997 |
| JP | 10-83815 | A | 3/1998 |
| JP | 10-116618 | A | 5/1998 |
| JP | 10-188986 | A | 7/1998 |
| JP | 10-206322 | A | 8/1998 |
| JP | 10-208744 | A | 8/1998 |
| JP | 10-302779 | A | 11/1998 |
| JP | 10-321224 | A | 12/1998 |
| JP | 11-16573 | A | 1/1999 |
| JP | 11-67205 | A | 3/1999 |
| JP | 11-273676 | A | 10/1999 |
| JP | 11-292542 | A | 10/1999 |
| JP | 11-307094 | A | 11/1999 |
| JP | 11-345615 | A | 12/1999 |
| JP | 2000-30693 | A | 1/2000 |
| JP | 2000-72445 | A | 3/2000 |
| JP | 2000-149945 | A | 5/2000 |
| JP | 2000-215884 | A | 8/2000 |
| JP | 2000-348721 | A | 12/2000 |
| JP | 2001-110420 | A | 4/2001 |
| JP | 2001-148249 | A | 5/2001 |
| JP | 2001-223008 | A | 8/2001 |
| JP | 2001-266851 | A | 9/2001 |
| JP | 2002-63901 | A | 2/2002 |
| JP | 2002-124261 | A | 4/2002 |

(56) References Cited

FOREIGN PATENT DOCUMENTS

| | | |
|---|---|---|
| JP | 3276183 B2 | 4/2002 |
| JP | 2002-164053 A | 6/2002 |
| JP | 2002-203552 A | 7/2002 |
| JP | 2002-216745 A | 8/2002 |
| JP | 2002-260655 A | 9/2002 |
| JP | 2002-289261 A | 10/2002 |
| JP | 2002-298914 A | 10/2002 |
| JP | 3334179 B2 | 10/2002 |
| JP | 2003-7299 A | 1/2003 |
| JP | 2003-17052 A | 1/2003 |
| JP | 2003-81637 A | 3/2003 |
| JP | 2003-151546 A | 5/2003 |
| JP | 2003-229129 A | 8/2003 |
| JP | 2004-6264 A | 1/2004 |
| JP | 2004-146374 A | 5/2004 |
| JP | 2004-172109 A | 6/2004 |
| JP | 2004-193115 A | 7/2004 |
| JP | 2004-214187 A | 7/2004 |
| JP | 2004-227790 A | 8/2004 |
| JP | 2004-253169 A | 9/2004 |
| JP | 2004-273451 A | 9/2004 |
| JP | 2004-355824 A | 12/2004 |
| JP | 2004-356094 A | 12/2004 |
| JP | 2005-11713 A | 1/2005 |
| JP | 2005-44743 A | 2/2005 |
| JP | 2005-53764 A | 3/2005 |
| JP | 2005-56602 A | 3/2005 |
| JP | 2005-60162 A | 3/2005 |
| JP | 2005-75691 A | 3/2005 |
| JP | 2005-183366 A | 7/2005 |
| JP | 2005-225734 A | 8/2005 |
| JP | 2005-235624 A | 9/2005 |
| JP | 2005-243636 A | 9/2005 |
| JP | 2005-251700 A | 9/2005 |
| JP | 2005-285572 A | 10/2005 |
| JP | 2005-289700 A | 10/2005 |
| JP | 2005-302507 A | 10/2005 |
| JP | 2005-302628 A | 10/2005 |
| JP | 2005-324973 A | 11/2005 |
| JP | 2005-327644 A | 11/2005 |
| JP | 2005-332707 A | 12/2005 |
| JP | 2005-347134 A | 12/2005 |
| JP | 2006-4724 A | 1/2006 |
| JP | 2006-19229 A | 1/2006 |
| JP | 2006-19310 A | 1/2006 |
| JP | 2006-54159 A | 2/2006 |
| JP | 2006-107818 A | 4/2006 |
| JP | 2006-107845 A | 4/2006 |
| JP | 2006-127923 A | 5/2006 |
| JP | 2006-127955 A | 5/2006 |
| JP | 2006-134816 A | 5/2006 |
| JP | 2006-134852 A | 5/2006 |
| JP | 2006-156126 A | 6/2006 |
| JP | 2006-156235 A | 6/2006 |
| JP | 2006-164758 A | 6/2006 |
| JP | 2006-286614 A | 10/2006 |
| JP | 3835266 B2 | 10/2006 |
| JP | 2006-302542 A | 11/2006 |
| JP | 2006-351379 A | 12/2006 |
| JP | 2007-48744 A | 2/2007 |
| JP | 2007-95443 A | 4/2007 |
| JP | 2007-194202 A | 8/2007 |
| JP | 2007-214138 A | 8/2007 |
| JP | 2007-226969 A | 9/2007 |
| JP | 2007-227368 A | 9/2007 |
| JP | 2007-257890 * | 10/2007 |
| JP | 2007-257890 A | 10/2007 |
| JP | 2007-280723 A | 10/2007 |
| JP | 2008-13405 A | 1/2008 |
| JP | 4070585 B2 | 4/2008 |
| JP | 2008-103132 A | 5/2008 |
| JP | 2008-181708 A | 8/2008 |
| JP | 2008-192547 A | 8/2008 |
| JP | 2008-266136 A | 11/2008 |
| JP | 2008-277106 A | 11/2008 |
| JP | 4175026 B2 | 11/2008 |
| JP | 2008-544468 A | 12/2008 |
| JP | 2009-117365 A | 5/2009 |
| JP | 2009-135070 A | 6/2009 |
| JP | 2009-151959 A | 7/2009 |
| JP | 4287901 B2 | 7/2009 |
| JP | 2009-289726 A | 12/2009 |
| JP | 2010-15959 A | 1/2010 |
| JP | 2010-47466 A | 3/2010 |
| JP | 2010-192200 A | 9/2010 |
| JP | 2011-44364 A | 3/2011 |
| JP | 2012-169224 A | 9/2012 |
| JP | 2012-243572 A | 12/2012 |
| JP | 2013-152911 A | 8/2013 |
| KR | 10-2010-0060362 A | 6/2010 |
| TW | 363940 | 7/1999 |
| WO | 02/086993 A1 | 10/2002 |
| WO | 03/003489 A1 | 1/2003 |
| WO | 2004/064180 A1 | 7/2004 |
| WO | 2007/072759 A1 | 6/2007 |
| WO | 2008/084679 A | 7/2008 |
| WO | 2009/011157 A1 | 1/2009 |
| WO | 2009/060603 A1 | 5/2009 |
| WO | 2009/063838 A1 | 5/2009 |
| WO | 2009/128289 A1 | 10/2009 |
| WO | 2010/049977 A1 | 5/2010 |
| WO | 2010/113512 A1 | 10/2010 |
| WO | 2010/113583 A1 | 10/2010 |
| WO | 2011/007751 A1 | 1/2011 |
| WO | 2011/065391 A1 | 6/2011 |
| WO | 2011/108720 A1 | 9/2011 |
| WO | 2011/122448 A1 | 10/2011 |
| WO | 2012/098724 A1 | 7/2012 |
| WO | 2012/132071 A1 | 10/2012 |
| WO | 2012/132072 A1 | 10/2012 |
| WO | 2012/157143 A1 | 11/2012 |

OTHER PUBLICATIONS

European communication dated Oct. 27, 2014 in co-pending European patent application No. EP 10839166.5.
European communication dated Nov. 5, 2014 in co-pending European patent application No. EP 11856183.6.
European communication dated Oct. 20, 2014 in corresponding European patent application No. EP 12763420.2.
Office Action mailed Nov. 5, 2014 in co-pending U.S. Appl. No. 13/582,087.
Office Action mailed Nov. 14, 2014 in co-pending U.S. Appl. No. 13/582,096.
European Communication dated Jan. 5, 2015 in co-pending European patent application No. 11842456.3.
European Communication dated Dec. 9, 2014 in co-pending European patent application No. 11750768.1.
European Communication dated Dec. 9, 2014 in co-pending European patent application No. 11750762.4.
European Communication dated Feb. 17, 2015 in co-pending European patent application No. 11865511.7.
Chinese Communication dated Jan. 12, 2015 in corresponding Chinese patent application No. 201280004477.6.
International Search Report mailed Jan. 7, 2014 in co-pending PCT application No. PCT/JP2013/076598.
Journal of the the Electrochemical Society, vol. 151, No. 10, Sep. 2004, pp. A1707-A1711, "Comparison of Overcharge Behavior of AlPO4-Coated LiCoO2 and LiNi0.8Co0.1Mn0.1O2 Cathode Materials in Li-Ion Cells", Cho, et al.
Journal of Power Sources, vol. 146, 2005, pp. 39-44, "Performance of LiNiCoO2 materials for advanced lithium-ion batteries", Itou, et al.
Ceramics International, vol. 35, No. 4, May 2009, pp. 1633-1639, "Fine-sized LiNi0.8Co0.15Mn0.05O2 cathode particles prepared by spray pyrolysis from the polymeric precursor solutions", Ju, et al.
Journal of Alloys and Compounds, vol. 469, No. 1-2, Feb. 2009, pp. 304-309, "Effects of the ratio of manganese and nickel components on the characteristics of Lix(MnyNi1-y)Oz cathode powders prepared by spray pyrolysis", Ju, et al.
Journal of Power Sources, vol. 153, No. 2, Feb. 2006, pp. 345-349, "Improvement of 12V overcharge behavior of LiCoO2 cathode material by LiNi0.8Co0.1Mn0.1O2 addition in a Li-ion cell", Kim, et al.

(56) References Cited

OTHER PUBLICATIONS

Journal of Applied Electrochemistry, vol. 38, No. 5, Jan. 2008, pp. 613-617, "Comparative study of the preparation and electrochemical performance of LiNi1/2Mn1/2O2 electrode material for rechargeable lithium batteries", Lian, et al.
Notice of Allowance mailed Jan. 15, 2015 in co-pending U.S. Appl. No. 13/514,080.
Final Rejection mailed Jan. 23, 2015 in co-pending U.S. Appl. No. 13/576,548.
Final Rejection mailed Jan. 28, 2015 in co-pending U.S. Appl. No. 13/576,753.
Office Action—Restriction—mailed Jan. 26, 2015 in co-pending U.S. Appl. No. 13/581,423.
Final Rejection mailed Feb. 12, 2015 in co-pending U.S. Appl. No. 13/582,089.
Final Rejection mailed Feb. 13, 2015 in co-pending U.S. Appl. No. 13/582,087.
Office Action mailed Feb. 25, 2015 in co-pending U.S. Appl. No. 13/508,880.
Final Rejection mailed Feb. 24, 2015 in co-pending U.S. Appl. No. 13/695,663.
Final Rejection mailed Feb. 27, 2015 in co-pending U.S. Appl. No. 13/581,730.
Office Action mailed Feb. 26, 2015 in co-pending U.S. Appl. No. 13/582,101.
Office Action mailed Feb. 26, 2015 in co-pending U.S. Appl. No. 13/582,113.
Int. J. Electrochem Sci., vol. 4, 2009, pp. 1770-1778, "Improved High Rate Cycling of Li-rich Li(1.10)Ni(1/3)Co(1/3)Mn(1/3)O(2) Cathode for Lithium Batteries", Santhanam, et al.
Notice of Allowance mailed Mar. 20, 2014 in co-pending U.S. Appl. No. 13/258,120.
Final Rejection mailed Feb. 27, 2014 in co-pending U.S. Appl. No. 13/856,514.
Final Rejection mailed Jan. 27, 2014 in co-pending U.S. Appl. No. 13/581,546.
Final Rejection mailed Jan. 24, 2014 in co-pending U.S. Appl. No. 13/582,067.
Final Rejection mailed Jan. 27, 2014 in co-pending U.S. Appl. No. 13/581,814.
Final Rejection mailed Feb. 20, 2014 in co-pending U.S. Appl. No. 13/582,096.
Final Rejection mailed Feb. 7, 2014 in co-pending U.S. Appl. No. 13/582,101.
Final Rejection mailed Feb. 18, 2014 in co-pending U.S. Appl. No. 13/582,113.
European communication issued May 9, 2014 in co-pending European patent application No. EP 11739870.1.
Chinese communication dated May 12, 2014 in co-pending Chinese patent application No. CN 201180008573.3.
European communication issued May 9, 2014 in co-pending European patent application No. EP 11750704.6.
European communication issued May 22, 2014 in co-pending European patent application No. EP 11750705.3.
European communication issued May 6, 2014 in co-pending European patent application No. EP 11845955.1.
International Search Report mailed Dec. 25, 2012 in co-pending PCT application No. PCT/JP2012/074263.
International Search Report mailed Dec. 25, 2012 in co-pending PCT application No. PCT/JP2012/074266.
International Search Report mailed Dec. 25, 2012 in co-pending PCT application No. PCT/JP2013/064941.
Final Rejection mailed Jun. 18, 2014 in co-pending U.S. Appl. No. 13/508,880.
Final Rejection mailed Jun. 3, 2014 in co-pending U.S. Appl. No. 13/514,080.
Office Action mailed Jul. 1, 2014 in co-pending U.S. Appl. No. 13/576,548.
Office Action mailed Jul. 8, 2014 in co-pending U.S. Appl. No. 13/576,753.
International Preliminary Report on Patentability mailed Jul. 31, 2014 in co-pending PCT application No. PCT/JP2012/074263.
International Preliminary Report on Patentability mailed Jul. 31, 2014 in co-pending PCT application No. PCT/JP2012/074266.
Journal of the Electrochemical Society, 151 (11), 2004, pp. A1899-A1904, "Synthesis, Thermal, and Electrochemical Properties of AlPO4-Coated LiNi0.8Co0.1Mn0.1O2 Cathode Materials for Li-Ion Cell", Cho, et al.
Journal of the Electrochemical Society, 155 (3), 2008, pp. A239-A245, "Storage Characteristics of LiNi0.8Co0.1+xMn0.1-xO2 (x=0, 0.03, and 0.06) Cathode Materials for Lithium Ion Batteries", Eom, et al.
Machine English translation for CN 1710735 (2005), 9 pages, European Patent Office, http://translationportal.epo.org . . . , retrieved from the internet Oct. 6, 2014.
Final Rejection mailed Sep. 18, 2014 in co-pending U.S. Appl. No. 13/508,887.
Office Action mailed Sep. 18, 2014 in co-pending U.S. Appl. No. 13/856,514.
Office Action mailed Oct. 9, 2014 in co-pending U.S. Appl. No. 13/695,663.
Office Action mailed Sep. 9, 2014 in co-pending U.S. Appl. No. 13/514,080.
Office Action mailed Oct. 2, 2014 in co-pending U.S. Appl. No. 13/582,089.
Office Action mailed Oct. 3, 2014 in co-pending U.S. Appl. No. 13/581,730.
International Search Report mailed Jun. 8, 2010 in co-pending PCT application No. PCT/JP2010/053443.
International Preliminary Report on Patentability mailed Nov. 17, 2011 in co-pending PCT application No. PCT/JP2010/053443.
International Search Report mailed May 24, 2011 in co-pending PCT application No. PCT/JP2011/053271.
International Preliminary Report on Patentability mailed Sep. 26, 2013 in co-pending PCT application No. PCT/JP2011/053271.
International Search Report/Written Opinion mailed Mar. 8, 2011 in co-pending PCT application No. PCT/JP2010/071723.
International Preliminary Report on Patentability mailed Jul. 12, 2012 in co-pending PCT application No. PCT/JP2010/071723.
International Search Report mailed Jan. 24, 2012 in co-pending PCT application No. PCT/JP2011/072860.
International Preliminary Report on Patentability mailed Oct. 10, 2013 in co-pending PCT application No. PCT/JP2011/072860.
International Search Report/Written Opinion mailed Jan. 25, 2011 in co-pending PCT application No. PCT/JP2010/071724.
International Preliminary Report on Patentability issued Jul. 10, 2012 in co-pending PCT application No. PCT/JP2010/071724.
International Search Report mailed Apr. 26, 2011 in co-pending PCT application No. PCT/JP2011/052394.
International Preliminary Report on Patentability mailed Oct. 11, 2012 in co-pending PCT application No. PCT/JP2011/052394.
International Search Report mailed May 10, 2011 in co-pending PCT application No. PCT/JP2011/052399.
International Preliminary Report on Patentability mailed Oct. 11, 2012 in co-pending PCT application No. PCT/JP2011/052399.
International Search Report mailed Nov. 15, 2011 in co-pending PCT application No. PCT/JP2011/069042.
International Preliminary Report on Patentability mailed Aug. 1, 2013 in co-pending PCT application No. PCT/JP2011/069042.
International Search Report/Written Opinion mailed Jun. 7, 2011 in co-pending PCT application No. PCT/JP2011/054935.
International Preliminary Report on Patentability mailed Oct. 11, 2012 in co-pending PCT application No. PCT/JP2011/054935.
Japanese Communication mailed Oct. 1, 2013 in co-pending Japanese patent application No. JP 2012-503253.
International Search Report mailed Jun. 7, 2011 in co-pending PCT application No. PCT/JP2011/054938.
International Preliminary Report on Patentability mailed Nov. 22, 2012 in co-pending PCT application No. PCT/JP2011/054938.
Japanese Communication mailed Oct. 1, 2013 in co-pending Japanese patent application No. JP 2012-503255.
International Search Report/Written Opinion mailed May 17, 2011 in co-pending PCT application No. PCT/JP2011/054942.

(56) References Cited

OTHER PUBLICATIONS

International Preliminary Report on Patentability issued Oct. 2, 2012 in co-pending PCT application No. PCT/JP2011/054942.
International Search Report/Written Opinion mailed Jun. 7, 2011 in co-pending PCT application No. PCT/JP2011/054934.
International Preliminary Report on Patentability mailed Oct. 11, 2012 in co-pending PCT application No. PCT/JP2011/054934.
Japanese Communication mailed Oct. 1, 2013 in co-pending Japanese patent application No. JP 2012-503252.
International Search Report/Written Opinion mailed May 17, 2011 in co-pending PCT application No. PCT/JP2011/054941.
International Preliminary Report on Patentability issued Oct. 2, 2012 in co-pending PCT application No. PCT/JP2011/054941.
International Search Report mailed May 10, 2011 in co-pending PCT application No. PCT/JP2011/055111.
International Preliminary Report on Patentability mailed Nov. 22, 2012 in co-pending PCT application No. PCT/JP2011/055111.
International Search Report/Written Opinion mailed May 17, 2011 in co-pending PCT application No. PCT/JP2011/053710.
International Preliminary Report on Patentability issued Oct. 2, 2012 in co-pending PCT application No. PCT/JP2011/053710.
International Search Report/Written Opinion mailed May 24, 2011 in co-pending PCT application No. PCT/JP2011/054777.
International Preliminary Report on Patentability issued Oct. 2, 2012 in co-pending PCT application No. PCT/JP2011/054777.
International Search Report mailed May 24, 2011 in co-pending PCT application No. PCT/JP2011/054781.
Written Opinion mailed Jun. 24, 2011 in co-pending PCT application No. PCT/JP2011/054781.
International Preliminary Report on Patentability mailed Oct. 11, 2012 in co-pending PCT application No. PCT/JP2011/054781.
International Search Report/Written Opinion mailed May 24, 2011 in co-pending PCT application No. PCT/JP2011/054779.
International Preliminary Report on Patentability issued Oct. 2, 2012 in co-pending PCT application No. PCT/JP2011/054779.
International Search Report mailed Nov. 1, 2011 in co-pending PCT application No. PCT/JP2011/066722.
International Preliminary Report on Patentability mailed Jun. 13, 2013 in co-pending PCT application No. PCT/JP2011/066722.
International Search Report mailed Apr. 10, 2012 in co-pending PCT application No. PCT/JP2011/079535.
International Search Report mailed Jun. 5, 2012 in corresponding PCT application No. PCT/JP2012/057974.
Electrochimica Acta, vol. 51, 2006, pp. 5581-5586, "Preparation and electrochemical properties of $LiCoO_2$—$LiNi0.5Mn0.5O2$—$Li_2MnO_3$ solid solutions with high Mn contents", Sun, et al.
International Journal of Inorganic Materials 3 (2001), pp. 323-329, "Structural and electrochemical properties of Li—Ni—Co oxides synthesized by wet chemistry via a succinic-acid-assisted technique", Castro-Garcia, et al.
Office Action mailed Oct. 3, 2013 in co-pending U.S. Appl. No. 13/258,120.
Office Action—Restriction—mailed Mar. 12, 2013 in co-pending U.S. Appl. No. 13/508,887.
Office Action mailed Jun. 10, 2013 in co-pending U.S. Appl. No. 13/508,887.
Final Rejection mailed Sep. 19, 2013 in co-pending U.S. Appl. No. 13/508,887.
Office Action mailed Sep. 17, 2013 in co-pending U.S. Appl. No. 13/856,514.
Office Action mailed Jul. 16, 2013 in co-pending U.S. Appl. No. 13/514,080.
Office Action mailed Jul. 29, 2013 in co-pending U.S. Appl. No. 13/576,548.
Office Action mailed Aug. 1, 2013 in co-pending U.S. Appl. No. 13/581,546.
Office Action mailed Aug. 13, 2013 in co-pending U.S. Appl. No. 13/582,067.
Office Action mailed Jul. 17, 2013 in co-pending U.S. Appl. No. 13/581,814.
Office Action mailed Mar. 13, 2013 in co-pending U.S. Appl. No. 13/582,091.
Office Action mailed Jun. 19, 2013 in co-pending U.S. Appl. No. 13/582,096.
Office Action mailed Jul. 12, 2013 in co-pending U.S. Appl. No. 13/582,101.
Office Action mailed Jul. 15, 2013 in co-pending U.S. Appl. No. 13/582,113.
International Preliminary Report on Patentability mailed Oct. 10, 2013 in co-pending PCT application No. PCT/JP0212/057974.
Office Action mailed Dec. 4, 2013 in co-pending U.S. Appl. No. 13/508,880.
Office Action mailed Dec. 18, 2013 in co-pending U.S. Appl. No. 13/514,080.
Final Rejection mailed Jan. 9, 2014 in co-pending U.S. Appl. No. 13/576,548.
Notice of Allowance mailed Nov. 6, 2013 in U.S. Appl. No. 13/582,091, now U.S. Pat. No. 8,623,551.
Final Rejection mailed Jul. 29, 2015 in co-pending U.S. Appl. No. 13/508,880.
Office Action mailed Jun. 4, 2015 in co-pending U.S. Appl. No. 13/695,663.
Notice of Allowance mailed Jun. 30, 2015 in co-pending U.S. Appl. No. 13/576,548.
Notice of Allowance mailed May 20, 2015 in co-pending U.S. Appl. No. 13/582,087.
Final Rejection mailed Jun. 23, 2015 in co-pending U.S. Appl. No. 13/582,096.
Final Rejection mailed Jul. 1, 2015 in co-pending U.S. Appl. No. 13/582,101.
Final Rejection mailed Jun. 30, 2015 in co-pending U.S. Appl. No. 13/582,113.
Final Rejection mailed Jun. 24, 2015 in co-pending U.S. Appl. No. 13/816,822.
Japanese communication mailed Apr. 7, 2015 in co-pending Japanese patent application No. 2012-503258.
International Preliminary Report on Patentability mailed Mar. 19, 2015 in co-pending PCT application No. PCT/JP2013/064941.
International Preliminary Report on Patentability mailed Apr. 2, 2015 in co-pending PCT application No. PCT/JP2013/076598.
Wikipedia, Karl Fischer Titration article, Waybackmachine.com snapshot dtd., Sep. 12, 2010, 2 pages.
Office Action mailed Mar. 25, 2015 in co-pending U.S. Appl. No. 13/581,423.
Office Action mailed Mar. 18, 2015 in co-pending U.S. Appl. No. 13/816,822.
Office Action mailed Apr. 3, 2015 in co-pending U.S. Appl. No. 13/822,447.
Office Action mailed Apr. 23, 2015 in co-pending U.S. Appl. No. 14/364,795.
Office Action mailed Apr. 3, 2015 in co-pending U.S. Appl. No. 14/364,809.
Office Action mailed Apr. 3, 2015 in co-pending U.S. Appl. No. 14/364,830.
Notice of Allowance mailed Aug. 26, 2015 in co-pending U.S. Appl. No. 13/695,663.
Notice of Allowance mailed Sep. 10, 2015 in co-pending U.S. Appl. No. 13/576,753.
Notice of Allowance mailed Sep. 22, 2015 in co-pending U.S. Appl. No. 13/582,096.
Notice of Allowance mailed Oct. 22, 2015 in co-pending U.S. Appl. No. 13/582,101.
Notice of Allowance mailed Oct. 22, 2015 in co-pending U.S. Appl. No. 13/582,113.
Notice of Allowance mailed Sep. 8, 2015 in co-pending U.S. Appl. No. 14/364,795.
Notice of Allowance mailed Sep. 10, 2015 in co-pending U.S. Appl. No. 14/364,809.

* cited by examiner

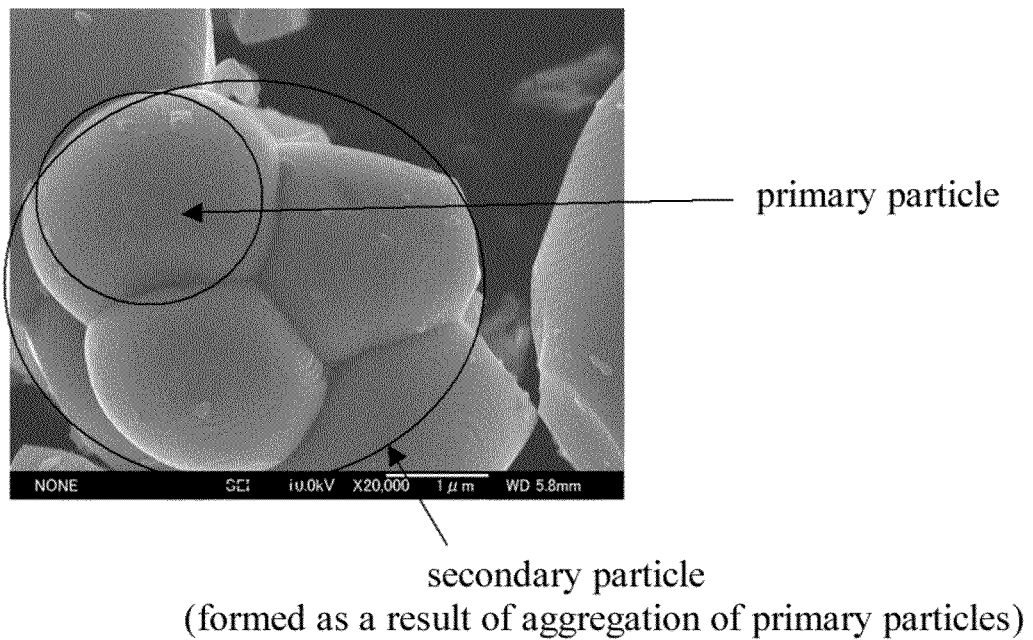
secondary particle
(formed as a result of aggregation of primary particles)

POSITIVE ELECTRODE ACTIVE MATERIAL FOR LITHIUM ION BATTERIES, POSITIVE ELECTRODE FOR LITHIUM ION BATTERIES, AND LITHIUM ION BATTERY

BACKGROUND

1. Technical Field

The present invention relates to a positive electrode active material for lithium ion batteries, a positive electrode for lithium ion batteries, and a lithium ion battery.

2. Related Art

In regard to the positive electrode active material for lithium ion batteries, lithium-containing transition metal oxides have been generally used. Specific examples thereof include lithium cobaltate ($LiCoO_2$), lithium nickelate ($LiNiO_2$), and lithium manganate ($LiMn_2O_4$), and in order to improve characteristics (an increase in capacity, cycle characteristics, storage characteristics, reduction of internal resistance, and rate characteristics) or to increase safety, compositization of these materials is in progress. Lithium ion batteries for large-sized applications such as for automobiles and for load leveling, are required to have characteristics that are different from batteries for mobile telephones or personal computers up to date.

For an improvement of battery characteristics, various methods have been hitherto used, and for example, Patent document 1 (Japanese Patent No. 4175026) discloses a method for producing a positive electrode material for lithium secondary batteries, the method including passing a lithium nickel composite oxide represented by the composition of:

$$Li_xNi_{1-y}M_yO_{2-\delta}$$

wherein $0.8 \leq x \leq 1.3$; $0 < y \leq 0.5$; M represents at least one element selected from the group consisting of cobalt (Co), manganese (Mn), iron (Fe), chromium (Cr), vanadium (V), titanium (Ti), copper (Cu), aluminum (Al), gallium (Ga), bismuth (Bi), tin (Sn), zinc (Zn), magnesium (Mg), germanium (Ge), niobium (Nb), tantalum (Ta), beryllium (Be), boron (B), calcium (Ca), scandium (Sc) and zirconium (Zr); $\delta$ corresponds to the amount of oxygen deficiency or oxygen excess, and represents $-0.1 < \delta < 0.1$, through a classifier, separating the composite oxide into particles having large particle sizes and particles having small particle sizes at an equilibrium separation particle size $Dh=1$ to 10 μm, and blending particles having large particle sizes with particles having small particle sizes at a weight ratio of 0:100 to 100:0. The Patent Literature recites that according to this method, a positive electrode material for lithium secondary batteries with various balances between rate characteristics and capacity can be easily manufactured.

Patent document 1: Japanese Patent No. 4175026

SUMMARY

The lithium nickel composite oxide described in Patent document 1 (Japanese Patent No. 4175026) is a material having an excess amount of oxygen in the composition; however, there is still room for an improvement to be used as a positive electrode active material for lithium ion batteries of higher quality.

Thus, it is an object of the present invention to provide a positive electrode active material for lithium ion batteries having satisfactory battery characteristics.

The inventors of the present invention conducted a thorough investigation, and as a result, they found that there is a close correlation between the amount of oxygen in the positive electrode active material, the particle size of primary particles, and the battery characteristics. That is, the inventors found that when the amount of oxygen in the positive electrode active material is adjusted to a certain value or more, and the particle size of primary particles of the positive electrode active material is controlled to an appropriate range, satisfactory battery characteristics are obtained.

Furthermore, the inventors found that there is a close correlation between the alkali content at the particle surfaces of the positive electrode active material, as well as the ratio between the amount of lithium hydroxide A and the amount of lithium carbonate B in the alkali amount at the particle surfaces, and the battery characteristics. That is, the inventors found that when the alkali content at the particle surfaces of the positive electrode active material is less than or equal to a certain value, and when the ratio A/B between the amount of lithium hydroxide A and the amount of lithium carbonate B in the alkali amount at the particle surfaces is less than or equal to a certain value, particularly satisfactory battery characteristics are obtained.

The present invention was achieved based on the findings described above, and according to one aspect of the present invention, there is provided a positive electrode active material for lithium ion batteries, which is represented by the following composition formula:

$$Li(Li_xNi_{1-x-y}M_y)O_{2+\alpha}$$

wherein in the above formula, M represents one or more selected from the group consisting of Sc, Ti, V, Cr, Mn, Fe, Co, Cu, Zn, Ga, Ge, Bi, Sn, Mg, Ca, B, and Zr; $0 \leq x \leq 0.1$; $0 < y \leq 0.7$; and $\alpha > 0$, and in which the particle size of primary particles is 1.6 μm to 2.3 μm, the alkali amount at the particle surfaces measured by two-stage neutralization and titration is 1.2% by mass or less, and when the amount of lithium hydroxide in the alkali amount at the particle surfaces is designated as A % by mass, and the amount of lithium carbonate is designated as B % by mass, the ratio A/B is 1 or less.

According to an embodiment of the positive electrode active material for lithium ion batteries related to the present invention, the alkali amount at the particle surfaces measured by two-stage neutralization and titration is 0.8% by mass or less.

According to another embodiment of the positive electrode active material for lithium ion batteries related to the present invention, the ratio A/B is 0.7 or less.

According to still another embodiment of the positive electrode active material for lithium ion batteries related to the present invention, M represents one or more selected from Mn and Co.

According to still another embodiment of the positive electrode active material for lithium ion batteries related to the present invention, in the composition formula, $\alpha > 0.05$.

According to still another embodiment of the positive electrode active material for lithium ion batteries related to the present invention, in the composition formula, $\alpha > 0.1$.

According to another aspect, there is provided a positive electrode for lithium ion batteries, which uses the positive electrode active material for lithium ion batteries related to the present invention.

According to still another aspect, there is provided a lithium ion battery which uses the positive electrode for lithium ion batteries related to the present invention.

According to the present invention, a positive electrode active material for lithium ion batteries having satisfactory battery characteristics can be provided.

BRIEF DESCRIPTION OF DRAWINGS

FIG. 1 is a photograph of the external appearance of primary particles and secondary particles of the positive electrode active material.

DETAILED DESCRIPTION (Configuration of Positive Electrode Active Material for Lithium Ion Batteries)

Regarding the material of the positive electrode active material for lithium ion batteries of the present invention, a wide variety of compounds which are useful as a positive electrode active material for the positive electrode of general lithium ion batteries can be used; however, it is particularly preferable to use lithium-containing transition metal oxides such as lithium cobaltate ($LiCoO_2$), lithium nickelate ($LiNiO_2$), and lithium manganate ($LiMn_2O_4$). The positive electrode active material for lithium ion batteries of the present invention that is produced by using such a material is represented by the following composition formula:

$$Li(Li_xNi_{1-x-y}M_y)O_{2+\alpha}$$

wherein in the formula, M represents one or more selected from Sc, Ti, V, Cr, Mn, Fe, Co, Cu, Zn, Ga, Ge, Bi, Sn, Mg, Ca, B and Zr; $0 \leq x \leq 0.1$; $0 < y \leq 0.7$; and $\alpha > 0$.

In the positive electrode active material for lithium ion batteries of the present invention, the proportion of oxygen is represented by $O_{2+\alpha}$ ($\alpha > 0$) in the composition formula as described above, and oxygen is contained in excess. Therefore, when the positive electrode active material is used in lithium ion batteries, battery characteristics such as capacity, rate characteristics, and capacity retention ratio are improved. Here, $\alpha$ is preferably such that $\alpha > 0.05$, and more preferably $\alpha > 0.1$.

The positive electrode active material for lithium ion batteries is composed of primary particles, secondary particles formed as a result of aggregation of primary particles, or a mixture of primary particles and secondary particles (see FIG. 1). Among these, the particle size of the primary particles is 1.6 μm to 2.3 μm. If the particle size of the primary particles is less than 1.6 μm, there may occur breakage of particles caused by pressing at the time of battery production, or a problem of deterioration caused by cracking of particles at the time of battery cycling. Furthermore, if the particle size of the primary particles is larger than 2.3 μm, a problem of battery deterioration occurs as a result of degradation of the electrolyte solution or an increase in the amount of the electrolyte solution. The particle size of the primary particles is preferably 1.8 μm to 2.1 μm.

The positive electrode active material for lithium ion batteries of the present invention is such that the alkali amount at the particle surfaces measured by two-stage neutralization titration is 1.2% by mass or less. If the alkali amount at the particle surfaces in the positive electrode active material for lithium ion batteries is greater than 1.2% by mass, a lithium ion battery using the positive electrode active material reacts with the electrolyte solution when charge and discharge is repeated. Furthermore, if the alkali amount is large, gases are generated. Therefore, deterioration of the battery occurs, and battery characteristics, particularly cycle characteristics, of lithium ion batteries become defective. The alkali amount measured by two-stage neutralization titration is preferably 0.8% by mass or less, and more preferably 0.6% by mass or less.

The positive electrode active material for lithium ion batteries of the present invention is such that in the alkali amount at the particle surfaces, when the amount of lithium hydroxide is designated as A % by mass, and the amount of lithium carbonate is designated as B % by mass, the ratio A/B is 1 or less. The alkalis contained in the positive electrode active material for lithium ion batteries are lithium hydroxide and lithium carbonate. Between these, if the ratio A/B, which is the ratio of the amount of lithium hydroxide to the amount of lithium carbonate, is greater than 1, because the proportion of lithium hydroxide which is a strong alkali becomes larger than the proportion of lithium carbonate which is a weak alkali, the pH value increases. Thus, battery characteristics, particularly cycle characteristics, of a lithium ion battery using the positive electrode active material become defective. The ratio A/B is preferably 0.7 or less, and more preferably 0.4 or less.

For the two-stage neutralization titration of the positive electrode active material for lithium ion batteries, a conventional method can be used, and for example, the method is defined in JIS K1201-3-1 (neutralization titration). Specifically, the relevant titration method is based on the following reactions between alkalis and acids.

$$LiOH + HCl \rightarrow LiCl + H_2O \quad (1)$$

$$Li_2CO_3 + HCl \rightarrow LiCl + LiHCO_3 \quad (2)$$

$$LiHCO_3 + HCl \rightarrow LiCl + CO_2 + H_2O \quad (3)$$

In a conventional titration method of using an indicator, pH 7.8 is detected for the reactions of (1) and (2), and this point of measurement is designated as a first endpoint. Also, pH 3.9 is detected for the reaction of (3), and this point of measurement is designated as a second endpoint. Furthermore, in the titration method according to JIS K1201-3-2 (potential difference titration), inflection points are detected from two sites, and the points are designated as a first endpoint and a second endpoint, respectively. Then, the mass percentages of lithium hydroxide and lithium carbonate are calculated from the amounts of HCl used to the respective endpoints.

(Positive Electrode for Lithium Ion Batteries, and Configuration of Lithium Ion Battery Using the Positive Electrode)

The positive electrode for lithium ion batteries according to an embodiment of the present invention has a structure in which, for example, a positive electrode mixture prepared by mixing the positive electrode active material for lithium ion batteries having the constitution described above, a conductive aid, and a binder, is provided on one surface or on both surfaces of a collector formed from aluminum foil or the like. Furthermore, the lithium ion battery related to an embodiment of the present invention includes the positive electrode for lithium ion batteries having such a configuration.

(Method for Producing Positive Electrode Active Material for Lithium Ion Batteries)

Next, the method for producing a positive electrode active material for lithium ion batteries according to an embodiment of the present invention will be described in detail.

First, a metal salt solution is prepared. The relevant metals are Ni, and one or more selected from Sc, Ti, V, Cr, Mn, Fe, Co, Cu, Zn, Ga, Ge, Bi, Sn, Mg, Ca, B, and Zr. Furthermore, examples of metal salts include sulfates, chlorides, nitrates, and acetates, and particularly, nitrates are preferred. This is because, even if incorporated as impurities into a calcination raw material, since nitrates can be directly calcined, the number of washing processes can be reduced, and also, nitrates function as oxidizing agents and have a function of promoting oxidation of metals in the calcination raw material. The various metals contained in the metal salts are adjusted so as to be present at a desired molar ratio. Thereby, the molar ratio of the various metals in the positive electrode active material is determined.

Subsequently, lithium carbonate is suspended in pure water, and then the metal salt solution of the metals described above is introduced therein, to thereby prepare a metal carbonate solution slurry. At this time, lithium-containing carbonates in the form of fine grains are precipitated in the slurry. Note that, in the case of metal salts such as sulfates and chlorides whose lithium compounds do not react at the time of a heat treatment, the salts are washed with a saturated lithium carbonate solution and then separated by filtration. In the case of metal salts such as nitrates and acetates whose lithium compounds react as lithium raw materials during a heat treatment, the metal salts are not washed but are directly separated by filtration and dried, so that the metal salts can be used as calcination precursors.

Next, the lithium-containing carbonates that have been separated by filtration are dried, and thereby a powder of a composite of lithium salts (precursor for lithium ion battery positive electrode material) is obtained.

Next, a calcining container having a predetermined capacity is provided, and the powder of the precursor for lithium ion battery positive electrode material is filled in this calcining container. Subsequently, the calcining container filled with the powder of the precursor for lithium ion battery positive electrode material is transferred into a calcination furnace, and calcination is carried out. Calcination is carried out by heating and retaining the powder for a predetermined time in an oxygen atmosphere. Furthermore, it is preferable that calcination is carried out under pressure at 101 to 202 kPa because the amount of oxygen in the composition is further increased.

The heating and retention temperature in the calcination process affects the particle size of the primary particles of the lithium ion battery positive electrode material. In the present invention, since lithium carbonate is used in the raw material, reactivity is weak compared with the case of using lithium hydroxide as a raw material. Therefore, calcination for a long time at a high temperature is required, but due to this calcination for a long time at a high temperature, crystallinity of the particles is enhanced, and the particle size of the primary particles of the positive electrode material increases. In the present invention, the particle size of the primary particles is controlled to 1.6 to 2.3 μm by using lithium carbonate in the raw material, and performing calcination for 12 hours or longer at a temperature of 750° C. or higher. To the contrary, when lithium hydroxide is used as the raw material, since reactivity is usually high, the calcination temperature becomes lower, and the calcination time becomes shorter. Therefore, the particle size of the primary particles thus produced decreases to about 0.5 μm.

Thereafter, the powder is taken out from the calcining container, and the powder is subjected to cracking using a commercially available cracking apparatus or the like. Thereby, a powder of a positive electrode active material is obtained. Cracking at this time is carried out by appropriately adjusting the cracking strength and the cracking time so that the production of a fine powder is suppressed as much as possible. Specifically, through this cracking, the volume percentage of fine particles having a particle size of 6 μm or less after cracking is adjusted to be 4.0% to 7.0%, and preferably 4.3% to 6.9%.

As such, by controlling the production of a fine powder at the time of cracking, the surface area of the powder per unit volume decreases, and therefore, the amount of lithium hydroxide at the particle surfaces can be suppressed.

Furthermore, since lithium carbonate is converted to lithium hydroxide in a place where moisture is present, incorporation of moisture is controlled by performing the cracking in a dry air atmosphere.

EXAMPLES

Hereinafter, Examples will be described so as to help better understanding of the present invention and advantages thereof, but the present invention is not intended to be limited to these Examples.

Examples 1 to 15

First, lithium carbonate in the feed amount described in Table 1 was suspended in 3.2 liters of pure water, and then 4.8 liters of a metal salt solution was introduced therein. Here, in regard to the metal salt solution, hydrides of nitrates of various metals were adjusted such that the various metals would be contained at the composition ratio described in Table 1, and such that the total mole number of metals would be 14 moles.

A lithium-containing carbonate in the form of fine grains was precipitated in the solution through this treatment, but this precipitate was separated by filtration using a filter press.

Subsequently, the precipitate was dried, and thus a lithium-containing carbonate (precursor for lithium ion battery positive electrode material) was obtained.

Next, a calcining container was provided, and the lithium-containing carbonate was filled in this calcining container. Subsequently, the calcining container was placed in a furnace in an oxygen atmosphere at atmospheric pressure, heated and retained for 10 hours at the calcination temperature described in Table 1, and then cooled to obtain an oxide.

Subsequently, the oxide thus obtained was cracked using a small-sized pulverizer (ACM-2EC manufactured by Hosokawa Micron, Ltd.) such that fine particles having a predetermined particle size would occupy a predetermined distribution width in the particle size distribution, and thus a powder of a lithium ion secondary battery positive electrode material was obtained.

Example 16

In Example 16, the same treatment as in Examples 1 to 15 was carried out, except that the various metals of the raw material for Example 16 were used at the composition indicated in Table 1, the metal salts used were chlorides, and after the lithium-containing carbonate was precipitated out, the precipitate was washed with a saturated lithium carbonate solution and filtered.

Example 17

The same treatment as in Examples 1 to 15 was carried out, except that the various metals of the raw material for Example 17 were used at the composition indicated in Table 1, the metal salts used were sulfates, and after the lithium-containing carbonate was precipitated out, the precipitate was washed with a saturated lithium carbonate solution and filtered.

Example 18

The same treatment as in Examples 1 to 15 was carried out, except that the various metals of the raw material for Example 18 were used at the composition indicated in Table 1, and calcination was carried out under pressure at a pressure of 120 kPa instead of atmospheric pressure.

Example 19

The same treatment as in Examples 1 to 15 was carried out, except that the various metals of the raw material for Example 19 were used at the composition indicated in Table 1, the metal salts used were nitrates, and after the lithium-containing carbonate was precipitated out, the precipitate was washed with a saturated lithium carbonate solution and filtered.

Comparative Examples 1 to 3

The same treatment as in Examples 1 to 15 was carried out, except that the various metals of the raw materials for Comparative Examples 1 to 3 were used at the respective compositions indicated in Table 1, and for the cracking of the final oxide, the conditioning such as that carried out in Examples 1 to 15 was not carried out.

Comparative Examples 4 to 6

The same treatment as in Comparative Example 1 was carried out, except that the various metals of the raw materials for Comparative Examples 4 to 6 were used at the respective compositions indicated in Table 1, and the calcination process was carried out in an atmosphere of air instead of an oxygen atmosphere.

Evaluation

—Evaluation of Positive Electrode Material Composition—

The metal contents of each of the various positive electrode materials were measured using an inductively coupled plasma emission spectrometer (ICP-OES), and the composition ratio (molar ratio) of the various metals was calculated. Also, the oxygen content was measured by the LECO method, and the value of a was calculated. It was confirmed that these results were as described in Table 1.

—Evaluation of Particle Size of Primary Particles—

A powder of each of the positive electrode materials was collected, and the particle size of the primary particles was measured using a laser diffraction particle size distribution analyzer (MICROTRACK MT3300EX II).

—Evaluation of Alkali Amount—

The alkali amount in the positive electrode material was measured by a two-stage neutralization titration method. Specifically, 1 g of a powder of each of the various positive electrode materials was collected and added to 50 mL of pure water. The mixture was stirred for 10 minutes, and then was filtered. Subsequently, 10 mL of the filtrate and 15 mL of pure water were introduced into a 50-mL tall beaker using a micropipette. Subsequently, phenolphthalein was added to the beaker as an indicator, a stirring bar was placed in the beaker, and the beaker was mounted on a magnetic stirrer. Electrodes were set up in the beaker. Subsequently, while the solution in the beaker was stirred, 0.01 N HCl was added dropwise thereto.

Here, the two-stage neutralization titration method is based on the following reactions between alkalis and acids.

$$LiOH + HCl \rightarrow LiCl + H_2O \quad (1)$$

$$Li_2CO_3 + HCl \rightarrow LiCl + LiHCO_3 \quad (2)$$

$$LiHCO_3 + HCl \rightarrow LiCl + CO_2 + H_2O \quad (3)$$

pH 7.8 was detected for the reactions of (1) and (2), and this point of measurement was designated as a first endpoint. Also, pH 3.9 was detected for the reaction of (3), and this point of measurement was designated as a second endpoint. Then, while the amount of HCl used up to the first endpoint was designated as x (mL), and the amount of HCl used up to the second endpoint was designated as y (mL), the amount of $Li_2CO_3$ was determined by the formula: $(y-x) \times 0.369\%$ by mass, and the amount of LiOH was determined by the formula: $(2x-y) \times 0.12\%$ by mass.

Furthermore, ratio of the amount of LiOH and the amount of $Li_2CO_3$ (amount of LiOH/amount of $Li_2CO_3$) was determined from those amounts thus calculated.

Note that, the calculation formula: $(y-x) \times 0.369\%$ by mass related to the amount of $Li_2CO_3$, and the calculation formula: $(2x-y) \times 0.12\%$ by mass related to the amount of LiOH were induced from the following formula.

The mole number of HCl in the formula (3) is determined by the following formula.

$$(y-x) \times 1/1000 \times 0.01 \text{ mol/L} = 10^{-5} \times (y-x) \text{ mol}$$

The mole number of $Li_2CO_3$ of the formula (2) is the same as the mole number of HCl, and since the molecular weight of $Li_2CO_3$ is 73.89, 10 mL out of 50 mL is used for the titration, and the original feed amount of the positive electrode material is 1 g, the amount of $Li_2CO_3$ is determined by the following formula:

$$73.89 \text{ g/mol} \times 10^{-5} \times (y-x) \text{ mol} \times (50 \text{ mL}/10 \text{ mL}) \div 1 \text{ g} \times 100\% = (y-x) \times 0.369\% \text{ by mass}$$

The mole number of LiOH of the formula (1) is determined by the following formula:

$$x \times 1/1000 \times 0.01 \text{ mol/L} - 10^{-5} \times (y-x) \text{ mol} = 10^{-5} \times (2x-y) \text{ mol}$$

Since the molecular weight of LiOH is 23.95, 10 mL our of 50 mL is used for the titration, and the original feed amount of the positive electrode material is 1 g, the amount of LiOH is determined by the following formula:

$$23.95 \text{ g/mol} \times 10^{-5} \times (2x-y) \text{ mol} \times (50 \text{ mL}/10 \text{ mL}) \div 1 \text{ g} \times 100\% = (2x-y) \times 0.12\% \text{ by mass}$$

—Evaluation of Battery Characteristics—

Each of the positive electrode materials, a conductive material, and a binder were weighed at a ratio of 85:8:7, and the positive electrode material and the conductive material were mixed with a solution prepared by dissolving the binder in an organic solvent (N-methylpyrrolidone) to obtain a slurry. The slurry was applied on an aluminum (Al) foil, dried and then pressed, and thus a positive electrode was produced. Subsequently, a 2032 type coin cell for evaluation was produced using Li for the opposite electrode, and the discharge capacity at a current density of 0.2 C was measured using a solution prepared by dissolving 1 M $LiPF_6$ in EC-DMC (1:1) as an electrolyte solution. Furthermore, the ratio of the discharge capacity at a current density of 2 C with respect to the battery capacity at a current density of 0.2 C was calculated to obtain the rate characteristics. Furthermore, the capacity retention ratio was measured by making a comparison between the initial discharge capacity and the discharge capacity after 100 cycles, which were obtained at a discharge current of 1 C at room temperature.

These results are presented in Tables 1 and 2.

TABLE 1

| | Amount of suspension of lithium carbonate (g) | Composition ratio of various metals in all metals except for Li | | | | | | | | | Retention temperature (°C.) | χ | α | Fine particles having particle size of 6 μm or less after cracking (volume %) |
|---|---|---|---|---|---|---|---|---|---|---|---|---|---|---|
| | | Ni | Co | Mn | Ti | Cr | Fe | Cu | Sn | Mg | | | | |
| Example 1 | 1393 | 33.3 | 33.3 | 33.3 | | | | | | | 1000 | 0.00 | 0.15 | 6.2 |
| Example 2 | 1393 | 33.3 | 33.3 | 33.3 | | | | | | | 1000 | 0.00 | 0.12 | 5.2 |
| Example 3 | 1393 | 33.3 | 33.3 | 33.3 | | | | | | | 1000 | 0.00 | 0.15 | 4.9 |
| Example 4 | 1393 | 33.3 | 33.3 | 33.3 | | | | | | | 1000 | 0.00 | 0.14 | 4.3 |
| Example 5 | 1442 | 33.3 | 33.3 | 33.3 | | | | | | | 970 | 0.025 | 0.17 | 6.3 |
| Example 6 | 1393 | 33.3 | 33.3 | 33.3 | | | | | | | 950 | 0.050 | 0.19 | 5.3 |
| Example 7 | 1393 | 33 | 33 | 33 | | | | | | 1 | 1000 | 0.00 | 0.12 | 4.9 |
| Example 8 | 1393 | 60 | 15 | 25 | | | | | | | 920 | 0.00 | 0.17 | 6.1 |
| Example 9 | 1393 | 60 | 15 | 25 | | | | | | | 900 | 0.00 | 0.15 | 6.8 |
| Example 10 | 1393 | 80 | 10 | 10 | | | | | | | 800 | 0.00 | 0.11 | 4.9 |
| Example 11 | 1393 | 80 | 15 | | 2.5 | | | | | 2.5 | 800 | 0.00 | 0.13 | 6.7 |
| Example 12 | 1393 | 80 | 15 | | | 5 | | | | | 800 | 0.00 | 0.11 | 6.2 |
| Example 13 | 1393 | 80 | 15 | | | | 5 | | | | 800 | 0.00 | 0.21 | 6.6 |
| Example 14 | 1393 | 80 | 15 | | | | | | 5 | | 800 | 0.00 | 0.11 | 6.2 |
| Example 15 | 1442 | 80 | 10 | 10 | | | | | | | 850 | 0.06 | 0.11 | 6.1 |
| Example 16 | 1393 | 33.3 | 33.3 | 33.3 | | | | | | | 1000 | 0.00 | 0.07 | 6.8 |
| Example 17 | 1393 | 33.3 | 33.3 | 33.3 | | | | | | | 1000 | 0.00 | 0.10 | 6.9 |
| Example 18 | 1393 | 33.3 | 33.3 | 33.3 | | | | | | | 950 | 0.00 | 0.23 | 4.5 |
| Example 19 | 1393 | 80 | 10 | 10 | | | | | | | 850 | 0.09 | 0.09 | 5.2 |
| Comparative Example 1 | 1393 | 33.3 | 33.3 | 33.3 | | | | | | | 1000 | 0.00 | 0.18 | 8.1 |
| Comparati2ve Example 2 | 1393 | 60 | 15 | 25 | | | | | | | 920 | 0.00 | 0.09 | 8.3 |
| Comparati2ve Example 3 | 1393 | 80 | 10 | 10 | | | | | | | 800 | 0.00 | 0.12 | 9 |
| Comparati4ve Example 4 | 1393 | 80 | 10 | 10 | | | | | | | 800 | 0.00 | −0.01 | 8 |
| Comparative Example 5 | 1442 | 80 | 10 | 10 | | | | | | | 850 | 0.11 | 0.08 | 7.9 |
| Comparative Example 6 | 1393 | 80 | 15 | | 2.5 | | | | | 2.5 | 800 | 0.10 | 0.00 | 7.8 |

TABLE 2

| | Particle size of primary particles (μm) | Alkali amount (mass %) | Amount of lithium hydroxide A (mass %) | Amount of lithium carbonate B (mass %) | A/B | Discharge capacity (mAh/g) | Rate characteristics (%) | Capacity retention ratio (%) |
|---|---|---|---|---|---|---|---|---|
| Example 1 | 2.3 | 0.134 | 0.024 | 0.110 | 0.218 | 153 | 92 | 92 |
| Example 2 | 2.1 | 0.134 | 0.024 | 0.110 | 0.218 | 154 | 92 | 91 |
| Example 3 | 2 | 0.158 | 0.019 | 0.139 | 0.137 | 157 | 95 | 92 |
| Example 4 | 2 | 0.121 | 0.048 | 0.073 | 0.658 | 155 | 95 | 93 |
| Example 5 | 1.9 | 0.135 | 0.015 | 0.120 | 0.125 | 155 | 93 | 92 |
| Example 6 | 1.9 | 0.102 | 0.016 | 0.086 | 0.186 | 160 | 92 | 89 |
| Example 7 | 1.7 | 0.123 | 0.012 | 0.111 | 0.108 | 158 | 92 | 88 |
| Example 8 | 1.8 | 0.248 | 0.02 | 0.268 | 0.075 | 175 | 88 | 87 |
| Example 9 | 1.8 | 0.637 | 0.211 | 0.426 | 0.495 | 172 | 89 | 88 |
| Example 10 | 1.8 | 0.544 | 0.172 | 0.372 | 0.461 | 195 | 87 | 85 |
| Example 11 | 1.8 | 0.537 | 0.159 | 0.378 | 0.419 | 185 | 87 | 85 |
| Example 12 | 1.8 | 0.840 | 0.208 | 0.639 | 0.326 | 186 | 88 | 84 |
| Example 13 | 1.6 | 0.900 | 0.209 | 0.691 | 0.303 | 187 | 85 | 82 |
| Example 14 | 1.6 | 0.581 | 0.249 | 0.332 | 0.750 | 180 | 88 | 83 |
| Example 15 | 1.7 | 1.200 | 0.450 | 0.750 | 0.600 | 185 | 87 | 85 |
| Example 16 | 1.8 | 0.123 | 0.012 | 0.111 | 0.108 | 153 | 90 | 87 |
| Example 17 | 2 | 0.132 | 0.012 | 0.12 | 0.100 | 151 | 90 | 86 |
| Example 18 | 1.9 | 0.135 | 0.000 | 0.135 | 0.000 | 156 | 95 | 93 |
| Example 19 | 1.6 | 0.620 | 0.309 | 0.311 | 0.994 | 185 | 87 | 87 |
| Comparative Example 1 | 1.5 | 0.178 | 0.075 | 0.103 | 0.728 | 153 | 91 | 85 |
| Comparative Example 2 | 1.5 | 0.151 | 0.078 | 0.073 | 1.068 | 165 | 83 | 78 |
| Comparative Example 3 | 1.4 | 0.248 | 0.12 | 0.168 | 0.714 | 180 | 83 | 82 |
| Comparative Example 4 | 1.5 | 0.800 | 0.319 | 0.481 | 0.663 | 170 | 80 | 78 |
| Comparative Example 5 | 1.4 | 1.210 | 0.62 | 0.59 | 1.051 | 178 | 82 | 80 |
| Comparative Example 6 | 1.5 | 0.600 | 0.249 | 0.351 | 0.709 | 171 | 79 | 74 |

Evaluation

Examples 1 to 19 all exhibited satisfactory battery characteristics. Furthermore, Examples 1 to 15 and 18, which used nitrates as the metal salts for the raw material, exhibited particularly satisfactory battery characteristics. Moreover, Example 18 in which calcination was carried out under pressure instead of atmospheric pressure exhibited the most satisfactory battery characteristics.

In Comparative Examples 1 to 3, the compositions of metals used as the raw material contained oxygen in excess, similarly to the present invention. However, due to the cracking conditions, the battery characteristics were poor. In Comparative Examples 4 to 6, the compositions of metals used as the raw material were not included in the scope of the present invention, and also, due to the cracking conditions, the battery characteristics were poor.

What is claimed is:

1. A positive electrode active material for lithium ion batteries, represented by the following composition formula:

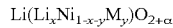
$Li(Li_xNi_{1-x-y}M_y)O_{2+\alpha}$ wherein M represents one or more selected from the group consisting of scandium (Sc), titanium (Ti), vanadium (V), chromium (Cr), manganese (Mn), iron (Fe), cobalt (Co), copper (Cu), zinc (Zn), gallium (Ga), germanium (Ge), bismuth (Bi), tin (Sn), magnesium (Mg), calcium (Ca), boron (B) and zirconium (Zr); $0 \leq x \leq 0.1$; $0 < y \leq 0.7$; and $\alpha > 0$, wherein the particle size of primary particles is 1.6 to 2.3 µm, the alkali amount at the particle surfaces measured by two-stage neutralization titration is 1.2% by mass or less, and when the amount of lithium hydroxide in the alkali amount at the particle surfaces is designated as A % by mass, and the amount of lithium carbonate is designated as B % by mass, the ratio A/B is 1 or less.

2. The positive electrode active material for lithium ion batteries according to claim 1, wherein the alkali amount at the particle surfaces is 0.8% by mass or less.

3. The positive electrode active material for lithium ion batteries according to claim 2, wherein the ratio A/B is 0.7 or less.

4. The positive electrode active material for lithium ion batteries according to claim 2, wherein M is one or more selected from Mn and Co.

5. The positive electrode active material for lithium ion batteries according to claim 2, wherein in the composition formula, $\alpha > 0.05$.

6. The positive electrode active material for lithium ion batteries according to claim 5, wherein in the composition formula, $\alpha > 0.1$.

7. A positive electrode for lithium ion batteries, using the positive electrode active material for lithium ion batteries according to claim 2.

8. The positive electrode active material for lithium ion batteries according to claim 1, wherein the ratio A/B is 0.7 or less.

9. The positive electrode active material for lithium ion batteries according to claim 1, wherein M is one or more selected from Mn and Co.

10. The positive electrode active material for lithium ion batteries according to claim 1, wherein in the composition formula, $\alpha > 0.05$.

11. The positive electrode active material for lithium ion batteries according to claim 10, wherein in the composition formula, $\alpha > 0.1$.

12. A positive electrode for lithium ion batteries, using the positive electrode active material for lithium ion batteries according to claim 1.

13. A lithium ion battery using the positive electrode for lithium ion batteries according to claim 12.

14. A lithium ion battery using the positive electrode for lithium ion batteries according to claim 7.

* * * * *